United States Patent
McKinney

[15] 3,679,225
[45] July 25, 1972

[54] HAND TRUCK

[72] Inventor: Merle B. McKinney, St. Louis, Mo.
[73] Assignee: Pioneer Liquor Company, Inc., St. Louis, Mo.
[22] Filed: April 24, 1969
[21] Appl. No.: 819,014

[52] U.S. Cl. .................................................. 280/47.18, 280/46
[51] Int. Cl. ................................................................ B62b 1/12
[58] Field of Search .................... 280/47.27, 47.24, 46, 47.18

[56] References Cited

UNITED STATES PATENTS

| 385,181 | 6/1888 | Huntly | 280/46 UX |
|---|---|---|---|
| 1,474,477 | 11/1923 | Huffman | 380/47.27 X |
| 1,234,667 | 7/1917 | Howe | 280/46 |
| 2,472,989 | 6/1949 | Skipper et al. | 280/46 |

FOREIGN PATENTS OR APPLICATIONS 415,837    9/1934    Great Britain ........................... 280/46

Primary Examiner—Benjamin Hersh
Assistant Examiner—John A. Pekar
Attorney—Cohn and Powell

[57] ABSTRACT

This hand truck provides an adaptor carriage for converting a two-wheel hand truck of the type having a carrying frame supported by a pair of wheels at one end and including a pusher stem at the other end, into a four-wheel truck in one simple operation. The adaptor carriage includes an axle having a ground wheel at each end, an adaptor unit mounted on the axle and an elongate pulling handle. The adaptor unit includes a sleeve having a pin transversely mounted thereon and interfitting the pusher stem in pivotal relation. The elongate handle is pivotally mounted to the adaptor unit.

3 Claims, 3 Drawing Figures

PATENTED JUL 25 1972 3,679,225

Inventor
MERLE B. McKINNEY

By Cohn and Powell
Attorneys 3,679,225

HAND TRUCK

BACKGROUND OF THE INVENTION

This invention relates in general to a hand truck, and in particular to an adaptor carriage for converting a two-wheel hand truck to a four-wheel hand truck.

The two-wheel hand truck, commonly known as a dolly, is a familiar sight in factories and stores and is an exceedingly useful vehicle for loading and transporting goods for a relatively short distance. The four-wheel hand truck which is capable of carrying much more bulky loads for greater distances, is equally familiar and just as useful as the two-wheel variety. Each of these trucks has a definite range of usefulness and, even in small factories and stores, it is almost essential to have at least one of each available.

The storage of such hand trucks when they are not in use presents some difficulty, particularly in the case of the four-wheel truck. It is a very awkward device to store vertically because, not only is it heavy, but it addition, the attached steering handle renders it very unwieldy.

In the past, attempts have been made to provide converter units of various kinds in which the two-wheel dolly is utilized as a base, and various attachments are built onto this unit as permanent features, though for incidental use. In this way, two-wheel dollies have been converted into stepladders, hospital carts and telescopic utility carts. In each case, the basic dolly has suffered more or less severe modification.

In those instances where an auxiliary carriage is provided to convert the common dolly to a four-wheel truck, the units are quite complex and do not utilize the dolly to provide cooperating mechanical parts.

SUMMARY OF THE INVENTION

This adaptor carriage eliminates the need for a permanent four-wheel hand truck because it provides a means of converting a two-wheel dolly into a four-wheel truck.

The adaptor carriage may be stored vertically and in fact, it is of such a size and compatible shape that it may be stored together with the dolly taking up virtually no additional space.

No permanent fixtures need be made to the dolly. When the adaptor carriage is not in use, the dolly may be used exactly as it is normally used. There are no projecting attachments to interfere with normal operation. The connection of the adaptor carriage to the dolly makes use of existing features of the conventional dolly to provide pivoting, cooperating mechanical parts.

The hand truck combination unit comprises a carrying frame, a pair of ground wheels mounted at one end of the frame and a pusher stem, attached to the other end of the frame. The adaptor carriage which converts the carrying frame, wheels and pusher stem into a four-wheel truck, includes an axle having ground wheels mounted thereon; an elongate handle having a hand grip portion at its remote end, and an adaptor. The adaptor detachably mounts the carrying frame to the axle and mounts the elongate handle to the axle. The adaptor also interconnects the pusher stem in interfitting relation to permit rotation of the adaptor carriage in a horizontal plane relative to the carrying frame and includes a seating base which receives the pusher stem in axially separable relation. The seating base is provided by a pin which extends transversely of the axle and interfits the pusher stem which acts as a socket. A sleeve which forms part of the adaptor is mounted in rotative relation on the axle and the pin is provided by a rivet which is attached by its head to the sleeve to provide a pivot pin interfitting the hollow sleeve of the pusher stem. The adaptor also includes pivot means carried by the axle and mounting the elongate handle to the axle.

A pair of spaced collars fixedly attached to the adaptor sleeve provides a journal means, and a journal pin extends between the collars. Mounted on the journal pin between the spaced collars is another collar which is fixedly attached to the elongate handle. This journal and collar arrangement permits the elongate handle to pivot in a vertical plane independently of the pin and socket connection between the adaptor and the pusher stem.

DESCRIPTION OF THE PREFERRED EMBODIMENT

Figure 2:
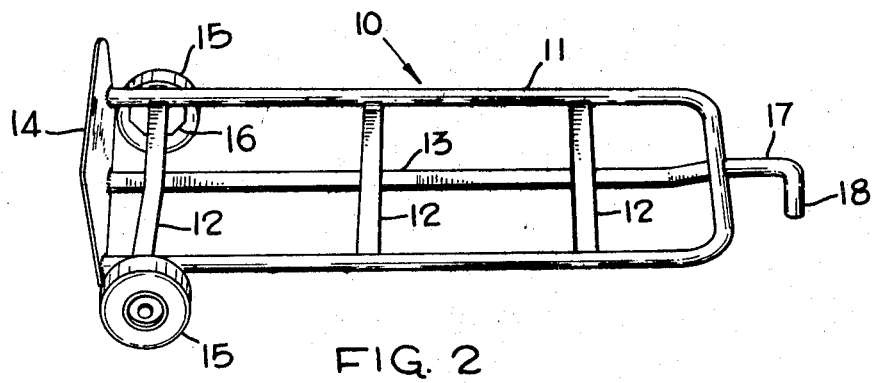
FIG. 2 is a perspective view of a conventional two-wheel hand truck.
Figure 1:
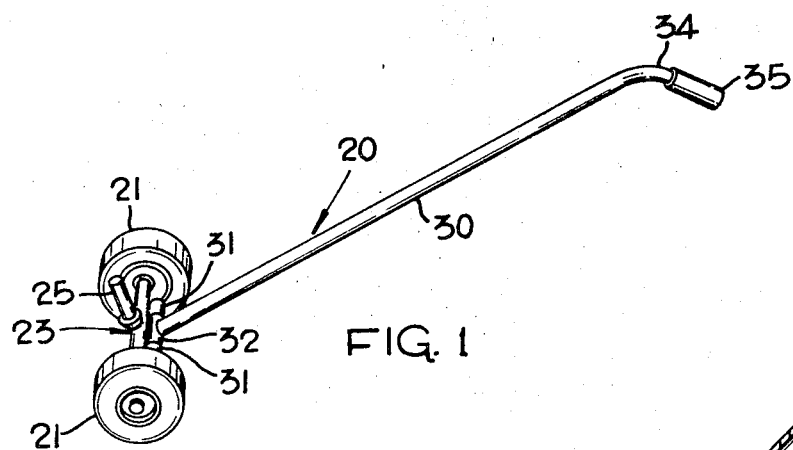
FIG. 1 is a perspective view of the adaptor carriage.

Referring now by characters of reference to the drawing, and first to FIGS. 1 and 2, it will be understood that the basic two-wheel dolly or hand truck 10 is converted into a four-wheel truck by combining the two-wheel truck 10 with an adaptor carriage 20.

The hand truck 10 includes a U-shaped carrying frame 11, the ends thereof being attached to a head board 14. The U-shaped frame 11 is stiffened by a plurality of lateral struts 12 and a longitudinal strut 13. The struts 12 and 13, in addition to providing rigidity to the hand truck 10, also facilitate the carrying of relatively small items thereon.

The carrying frame 11 is supported on a pair of ground wheels 15 at one end. The journal means 16 depend from the frame 11 and support the axle (not shown) extending between the ground wheels 15. At its other end, the truck 10 includes a handle 17 having a pusher stem 18 depending therefrom substantially at right angles to the carrying frame 11. In the conventional truck, the U-shaped carrying frame 11 and the handle 17 are tubular members.

Figure 3:
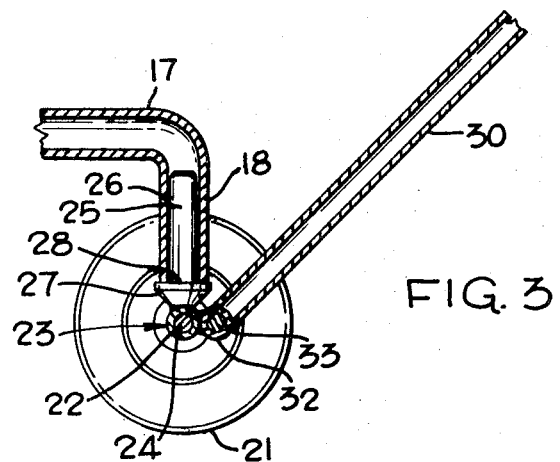
FIG. 3 is an enlarged, fragmentary detail in cross section of the interconnected parts with the adaptor carriage in place.

The adaptor carriage 20 includes a pair of ground wheels 21 interconnected by an axle 22 (FIG. 3) extending therebetween. An adaptor means generally shown by numeral 23 interconnects the pusher stem 18 and the elongate handle 30 to the axle 22.

The adaptor means 23 includes a sleeve 24 mounted in rotative relation on the axle 22. A rivet 25 having a shank 26 and a head 27 is attached to the sleeve 23 by the rivet head 27 as by welding. The rivet 25 projects transversely of the axle sleeve 24, and the shank 26 constitutes a pin interfitting the socket provided by the pusher stem 18. The underside face 28 of the rivet head 27 provides a seating means for the stem 18, thereby providing a limit to the reception of the shank in an axial direction within the socket provided by the pusher stem 18. Further, because the pusher stem 18 embraces the shank 26, the shank 26 constitutes a stop means precluding relative radial movement between the pusher stem 18 and the shank 26. It will be understood that the fit of the shank 26 within the stem 18 provides sufficient clearance to permit the shank 26 to pivot within the socket, thereby allowing the adaptor means and the axle 22 to pivot in a horizontal plane relative to the carrying frame 11.

The adaptor means 23 includes a pair of spaced collars 31 attached to the sleeve 24 as by welding. These collars 31 constitute journal bearings receiving a journal pin 33 (FIG. 3) extending therebetween. Mounted on the pin 33 in rotative relation thereto, is an intermediate collar 32 to which is attached, as by welding, the elongate handle 30. This arrangement, of course, permits the handle 30 to be pivoted about the journal pin 33 in the vertical plane and this feature greatly facilitates the manipulation of the handle as the combination four-wheel truck is pushed or pulled by an operator. The elongate handle 30 includes a bent portion 34 at its remote end which carries a hand grip 33 to facilitate the pulling of the truck.

It is thought that the functional advantages of this combination four-wheel truck have become fully apparent from the foregoing description of parts, but for completeness of disclosure, the installation will be briefly described.

Two-wheel dollies of the type illustrated in FIG. 1 commonly are provided with a unitary handle 17 having a downwardly depending stem 18. In order to prevent binding of the rivet shank 26 within the stem 18 as the adaptor carriage 20 is rotated relative to the carrying frame 11, the stem 18 should be substantially vertical. Obviously, some tolerance is permissible in this connection, and the normal clearance between the rivet shank 26 and the stem 18 is such as to allow for some deviation from this ideal, vertical position.

The pusher stem 18 which is provided on most conventional two-wheel trucks 10 can easily be bent so that it is substantially vertical when the adaptor carriage 20 and the truck 10 become interconnected. Generally speaking, in the interconnected position, the carrying frame 11 is substantially horizontal. And in this case, the pusher stem 18 should be substantially at right angles to the carrying frame so that it depends substantially vertically. Essentially, orientation of the pusher stem 18 depends on the relative spacing of the front and rear axles of the combination truck from the plane of the carrying frame 11, and minor adjustments may easily be made to cater to differences in trucks provided by various manufacturers. If necessary, of course, an existing handle which is unsuitable may be removed and a substitute handle having the configuration generally illustrated in FIG. 2, may be welded to the frame 11.

The two-wheel truck 10 and the adaptor carriage 20 are interconnected simply by lowering the truck 10 onto to the adaptor carriage 20, and interfitting the pin provided by the rivet shank 26 into the socket provided by the pusher stem 18. These two elements are axially separable at will, and disconnection is just as simple as connection.

In the preferred embodiment, a rivet 25 provides the interfitting medium between the truck 10 and the carriage 20. A rivet provides a particularly satisfactory connection, but a sleeve or socket member could also be attached as by welding to the sleeve 24. This socket member would then receive the pusher stem 18 as though the stem were a pin. This alternative connection would retain the desirable feature, whereby the pusher stem 18 is part of the pivotal connection between the truck 10 and the carriage 20.

I claim as my invention:

1. A hand truck, comprising:
  a. a carrying frame including:
    1. ground wheels mounted at one end of the frame, and
    2. a pusher stem attached to the other end of the frame in depending relation to said frame, and
  b. an adaptor carriage including:
    1. an axle,
    2. a ground wheel mounted on the axle,
    3. an elongate handle having a hand grip portion at its remote end,
    4. adaptor means detachably mounting the carrying frame to the axle, and mounting the elongate handle to the axle, and
    5. the adaptor means receiving the pusher stem in pivotal relation to permit relative rotation of the adaptor carriage and the carrying frame about the pusher stem,
  c. the adaptor means including an elongate element projecting transversely of the axle and interfitting the pusher stem in axially separable relation,
  d. the adaptor including pivot means carried by the axle and mounting the elongate handle in pivotal relation to the axle to permit movement of the handle relative to the elongate element.

2. A hand truck comprising:
  a. a carrying frame including:
    1. ground wheels mounted at one end of the frame, and
    2. a pusher stem attached to the other end of the frame, and
  b. an adaptor carriage including:
    1. an axle,
    2. a ground wheel mounted on the axle,
    3. an elongate handle having a hand grip portion at its remote end,
    4. adaptor means detachably mounting the carrying frame to the axle, and mounting the elongate handle to the axle, and
    5. the adaptor means receiving the pusher stem in pivotal relation to permit relative rotation of the adaptor carriage and the carrying frame,
  c. the adaptor means including:
    1. sleeve means rotatively mounted on the axle, and
    2. a pin fixedly attached and projecting transversely from the sleeve means, the pin interfitting the pusher stem in axially separable relation,
  d. the adaptor means also including pivot means carried by the sleeve means, the pivot means including relatively rotating journal members, one of the journal members being attached to the elongate handle to provide rotation thereof relative to the sleeve means.

3. A hand truck comprising:
  a. a carrying frame including:
    1. ground wheels mounted at one end of the frame, and
    2. a pusher stem attached to the other end of the frame, and
  b. an adaptor carriage including:
    1. an axle,
    2. a pair of ground wheels mounted on the axle,
    3. an elongate handle having a hand grip portion at its remote end,
    4. adaptor means detachably mounting the carrying frame to the axle, and mounting the elongate handle to the axle, and
    5. the adaptor means receiving the pusher stem in pivotal relation to permit relative rotation of the adaptor carriage and the carrying frame,
    6. the pusher stem being hollow and depending downwardly from the frame in the operative position, and
  c. the adaptor means including:
    1. a sleeve mounted in rotative relation to the axle,
    2. a pivot means including a rivet having a shank and a head, the rivet being fixedly attached to the sleeve by the head, the shank projecting transversely of the sleeve to provide a pivot pin interfitting the hollow pusher stem in axially separable relation, and
    3. journal means interconnecting the elongate handle in pivotal relation to the sleeve, the journal means including a pair of spaced journal members having a journal pin mounted therebetween and a collar rotatively mounted on the journal pin, the collar being fixedly attached to the elongate handle.

* * * * *